United States Patent
Ritz

(10) Patent No.: US 6,338,100 B1
(45) Date of Patent: Jan. 8, 2002

(54) MICROCONTROLLER HAVING SRAM FOR STORING PROGRAM INSTRUCTIONS AND PROGRAM INTERFACE FOR OBTAINING THE PROGRAM INSTRUCTIONS FROM AN EXTERNAL SOURCE

(75) Inventor: Terry G. Ritz, New Branfels, TX (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 0 days.

(21) Appl. No.: 08/275,307

(22) Filed: Jul. 15, 1994

Related U.S. Application Data

(63) Continuation of application No. 07/649,452, filed on Feb. 1, 1991, now abandoned.

(51) Int. Cl.[7] .............................................. G06F 3/00
(52) U.S. Cl. .............................. 710/5; 710/23; 710/62; 710/129
(58) Field of Search ................................ 395/400, 425, 395/800, 325, 275; 365/189.01, 230.01; 710/23, 5, 62, 129

(56) References Cited

U.S. PATENT DOCUMENTS

| | | | | |
|---|---|---|---|---|
| 3,813,649 A | * | 5/1974 | Struger et al. ............... | 395/275 |
| 4,056,711 A | * | 11/1977 | Lamar ......................... | 235/454 |
| 4,078,259 A | * | 3/1978 | Soulsby et al. .............. | 395/425 |
| 4,079,452 A | * | 3/1978 | Larson et al. ................ | 395/275 |
| 4,244,032 A | * | 1/1981 | Oliver ......................... | 395/425 |
| 4,291,375 A | * | 9/1981 | Wolf ........................... | 364/483 |
| 4,441,164 A | * | 4/1984 | Pavan et al. ................. | 395/115 |
| 4,498,151 A | * | 2/1985 | Henry ......................... | 395/425 |
| 4,575,814 A | * | 3/1986 | Brooks, Jr. et al. .......... | 395/425 |
| 4,713,756 A | * | 12/1987 | Mackiewicz et al. ........ | 365/228 |
| 4,718,003 A | * | 1/1988 | Andersen et al. ....... | 395/200.08 |
| 4,785,425 A | * | 11/1988 | Lavelle ......................... | 365/52 |
| 4,893,281 A | * | 1/1990 | Hashimoto ............. | 365/230.06 |
| 4,912,630 A | * | 3/1990 | Cochcroft, Jr. ............. | 395/425 |
| 5,023,843 A | * | 6/1991 | Love ........................... | 365/222 |
| 5,099,453 A | * | 3/1992 | Steele ......................... | 365/229 |
| 5,111,079 A | * | 5/1992 | Steele ......................... | 307/465 |
| 5,144,582 A | * | 9/1992 | Steele ..................... | 365/189.08 |
| 5,200,600 A | * | 4/1993 | Shinagawa .................. | 235/492 |
| 5,243,342 A | * | 9/1993 | Kattemalalavadi et al. . | 341/106 |

* cited by examiner

Primary Examiner—Krisna Lim
(74) Attorney, Agent, or Firm—Foley & Lardner

(57) ABSTRACT

A microcontroller of the type adapted to be coupled to a microprocessor and arranged to operate as a slave to the microprocessor includes an execution unit for executing its own stored set of program instructions. The microcontroller includes a static random access memory for storing the program instructions and a program interface coupled to the static random access memory and arranged to be coupled to the microprocessor for obtaining the program instructions from the microprocessor. The program interface includes an address generator for addressing the storage locations of the static random access memory for programming the static random access memory with the program instructions obtained from the microprocessor. The microcontroller further includes a program verifier to permit the microprocessor to read the stored program instructions and the sum of the program instruction multiple-bit data bytes for verification.

22 Claims, 2 Drawing Sheets

MICROCONTROLLER HAVING SRAM FOR STORING PROGRAM INSTRUCTIONS AND PROGRAM INTERFACE FOR OBTAINING THE PROGRAM INSTRUCTIONS FROM AN EXTERNAL SOURCE

This application is a continuation of application Ser. No. 07/649,452, filed Feb. 1, 1991, now abandoned.

BACKGROUND OF THE INVENTION

The present invention generally relates to a microcontroller which executes instructions responsive to internally stored program instructions. The present invention more particularly relates to such a microcontroller wherein the microcontroller includes a static random access memory for internally storing the program instructions and a program interface for obtaining the program instructions from an external source and storing the program instruction in the static random access memory. The present invention still more particularly relates to such a microcontroller wherein the external source of the program instructions is a microprocessor and wherein the microcontroller is arranged to operate as a slave with respect to the microprocessor.

Microcontrollers for use in association with microprocessors and which operate as slave devices with respect to such microprocessors are well known in the art. Such microcontrollers perform instruction executions in response to program instructions residing in internal memory. However, such executions are initiated through commands received from the microprocessors. Hence, such microcontrollers are slaves to the microprocessors because, although they execute instructions dictated by their own set of program instructions, they do so on command from the microprocessors.

The memories employed in present microcontrollers for storing the program instructions take the form of either read only memories or erasable programmable read only memories. Read only memories are memories wherein data, such as program instructions, are permanently stored in the memory. Once such a memory is programmed, the memory cannot thereafter be updated or modified. Erasable programmable read only memories are memories wherein the stored data is not permanently stored, but can be electronically updated or modified. Such data memory modification or programming must be performed by separate external programming equipment.

While such read only memories and erasable programmable read only memories have been generally successful in providing program instructions to the microcontrollers in which they are used, they have exhibited some limitations. One primary limitation has been that the microcontrollers which use these memories are limited for a particular format of instruction code, and hence, only one application. Hence, a microcontroller using a read only memory will not be suitable for use with any other microprocessor other than the particular type of microprocessor that the read only memory was programmed to be used with. A completely new microcontroller with a new read only memory would be required if program instruction modification or updating was necessitated by an updated microprocessor, for example.

In the case of erasable programmable read only memories, if it is desired to use a microcontroller incorporating such a memory with a different type of microprocessor or an updated version of the microprocessor for which the erasable programmable read only memory was originally programmed to be compatible with, the microcontroller would have to be physically removed from its system and then the memory reprogrammed by an external and separate electronic programmer.

The microcontroller of the present invention overcomes these noted limitations of prior art microcontrollers by providing a microcontroller which utilizes a static random access memory instead of a read only memory or an erasable programmable read only memory. While a static random access memory is a volatile memory in that it must be reprogrammed each time the microcontroller and the system utilizing the static random access memory based microcontroller is initialized, because microcontrollers generally operate as slave devices to a microprocessor, the microprocessor can serve as an external programming source for providing the static random access memory with program instructions. Most microprocessors have a large amount of memory space, usually provided by dynamic random access memories. As a result, the amount of memory space for maintaining the microcontroller program instructions represent only a small portion of the microprocessor memory. Also, the time required to program the static random access memory is relatively short and adds only a small amount of time to the initialization time required for the microprocessor to run its standard checks of memory, et cetera, upon initialization. Hence, the microcontroller of the present invention allows its program instructions to be maintained in external memory. Also, should a different microprocessor be selected for operating with the microcontroller, the static random access memory of the microcontroller can be programmed by the new microprocessor so as to be compatible with the new microprocessor.

As will be seen hereinafter, the microcontroller of the present invention includes a program interface which addresses the static random access memory and obtains the program instructions from the microprocessor for programming the static random access memory with the operating instructions. The microcontroller of the present invention also includes a program verifier to enable the program instructions stored in the static random access memory to be verified by the microprocessor after programming has been completed.

SUMMARY OF THE INVENTION

The invention provides, in a microcontroller of the type which includes an execution unit for executing stored program instructions, a memory system for storing the program instructions and including a memory for storing the program instructions, the memory including a static random access memory, and a program interface coupled to the static random access memory and arranged to be coupled to an external source of the program instructions for programming the static random access memory by providing the static random access memory with the program instructions from the external source of the program instructions.

The present invention further provides a microcontroller of the type adapted to be coupled to a microprocessor and arranged to operate as a slave to the microprocessor wherein the microcontroller is of the type which includes an execution unit for executing its own set of program instructions and includes a memory system for obtaining the program instructions from the microprocessor and internally storing the program instructions. The microcontroller includes a static random access memory having a plurality of addressable storage locations for storing the program instructions and a programmer coupled to the static random access memory and arranged to be coupled to the microprocessor for obtaining the program instructions from the microprocessor. The programmer includes an address generator for addressing the storage locations and storing the program instructions within the storage locations of the static random access memory.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference characters identify identical elements, and wherein:

DETAILED DESCRIPTION OF THE PREFERRED EMBODIMENT

Figure 1:
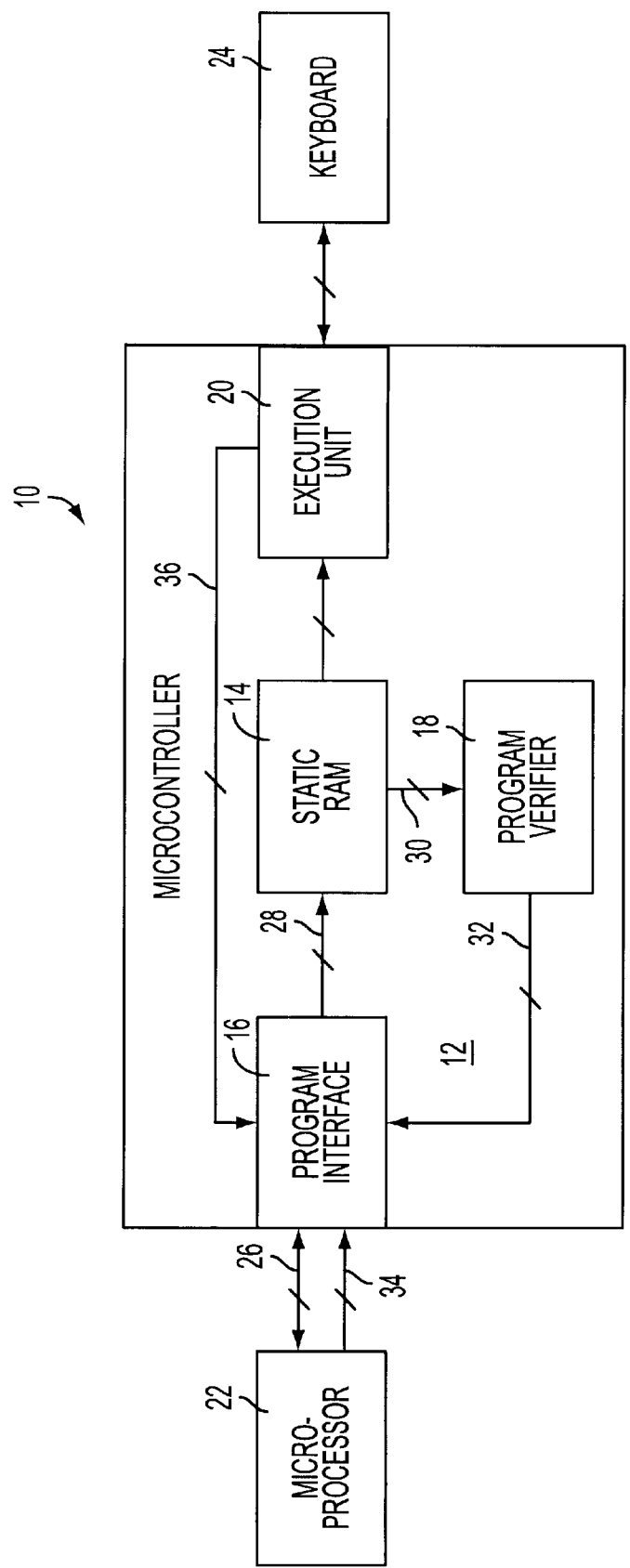
FIG. 1 is a schematic block diagram of a microcontroller embodying the present invention shown in operative relation with a microprocessor.

Referring now to FIG. 1, it illustrates a microcontroller 10 embodying the present invention. The microcontroller 10 is illustrated in operative association with a microprocessor 22 and a keyboard 24. The microcontroller 10 generally includes a memory system 12 embodying the present invention which includes a static random access memory 14, a program interface 16, and a program verifier 18. The microcontroller 10 further includes an execution unit 20.

Aside from the memory system 12 including the static random access memory 14, the program interface 16 and the program verifier 18, the microcontroller 10, in accordance with this preferred embodiment, is preferably an 8042 equivalent IBM PC/AT keyboard microcontroller of the type well known in the art. Also, in a well known manner, the static random access memory 14 may be configured to be a direct replacement for the read only memory or erasable programmable read only memory previously utilized in 8042 microcontrollers.

The microprocessor is preferably a 286-based microprocessor of the type well known in the art and the keyboard 24 may be an IBM PC/AT type keyboard well known in the art. As will be appreciated by those skilled in the art, 8042 microcontrollers are commonly utilized for interfacing 286-based microprocessors with IBM PC/AT type keyboards. In such an application, the 8042 microcontroller operates as a slave with respect to the microprocessor with the execution unit 20 executing instructions dictated by program instructions stored within the internal memory of the microcontroller under commands from the microprocessor.

The static random access memory 14 is provided to store the program instructions for the microcontroller 10 which are in the form of multiple-bits of data. Because the memory 14 is a static random access memory, the program instructions must be programmed into the memory 14 upon each initialization of the microprocessor 22, the microcontroller 10, and the keyboard 24. To that end, the microprocessor 22 serves as an external source of program instructions for the static random access memory 14.

The program interface 16 serves as a programmer to obtain the program instructions from the microprocessor 22 and to provide the program instructions to the memory 14 for programming the memory. To that end, the program interface 16 is coupled to the microprocessor 12 by a parallel multiple-bit bi-directional bus 26. The program interface 16 in turn conveys the program instructions represented by the multiple-bits of data to the static random access memory 14 over another multiple-bit parallel bus 28.

Once the static random access memory 14 has been programmed with its program instructions, the program verifier 18 enables the microprocessor 22 to read the program instructions stored in the static random access memory 14 for verification purposes. Another multiple-bit parallel bus 30 couples the static random access memory 14 to the program verifier 18 for providing the program verifier 18 with the program instructions stored therein. As will be seen hereinafter, the program verifier 18 further includes a summer for generating a multiple-bit word representing the sum of all of the program instruction multiple-bit bytes of data and a conveyor for conveying the generated multiple-bit sum word to the microprocessor 22. The microprocessor 22 is preferably arranged to compare the generated multiple-bit sum word with a predetermined multiple-bit word representing the known sum of all of the program instruction multiple-bit bytes of data for further verification. A further multiple-bit parallel bus 32 couples the program verifier 18 to the program interface 16. The bus 32 conveys the program instructions being read by the microprocessor 22 and the generated multiple-bit sum word of the program instructions to the program interface 16. As will be seen hereinafter, the program interface includes another multiple-bit parallel bus adapted to be coupled to the bus 26 for conveying the program instructions being read by the microprocessor 22 and the generated multiple-bit sum word of the program instructions to the microprocessor 22.

The programming of the static random access memory 14 is initiated by the microprocessor 22 over a set of control lines 34. As will be seen with reference to FIG. 2, the program interface 16 includes an address generator for generating multiple-bit addresses corresponding to the plurality of addressable storage locations within the static random access memory 14. When the static random access memory 14 is being programmed, the program interface addresses the static random access memory storage locations and provides the static random access memory 14 with the program instructions from the microprocessor 22 for storing the program instructions within the plurality of storage locations of the static random access memory 14.

After the programming the static random access memory 14 is completed, the memory system 12 remains in a program mode responsive to the control signals from the microprocessor 22. The program verifier 18 then provides the program instructions stored in the static random access memory 14 and the generated multiple-bit sum word of all of the program instructions to the microprocessor 22 through the program interface 16 for verification purposes. Once the programming of the static random access memory 14 has been verified, the memory system 12, responsive to the control signals from the microprocessor 22, enters an operate mode wherein the memory address generation within the program interface 16 is terminated and the execution unit 20 is coupled to the program interface 16 to enable the execution unit 20 to address the addressable storage locations of the static random access memory 14 for obtaining the program instructions required by the execution unit 20. To that end, the execution unit 20 is coupled to the program interface 16 by another multiple-bit bus 36.

Figure 2:
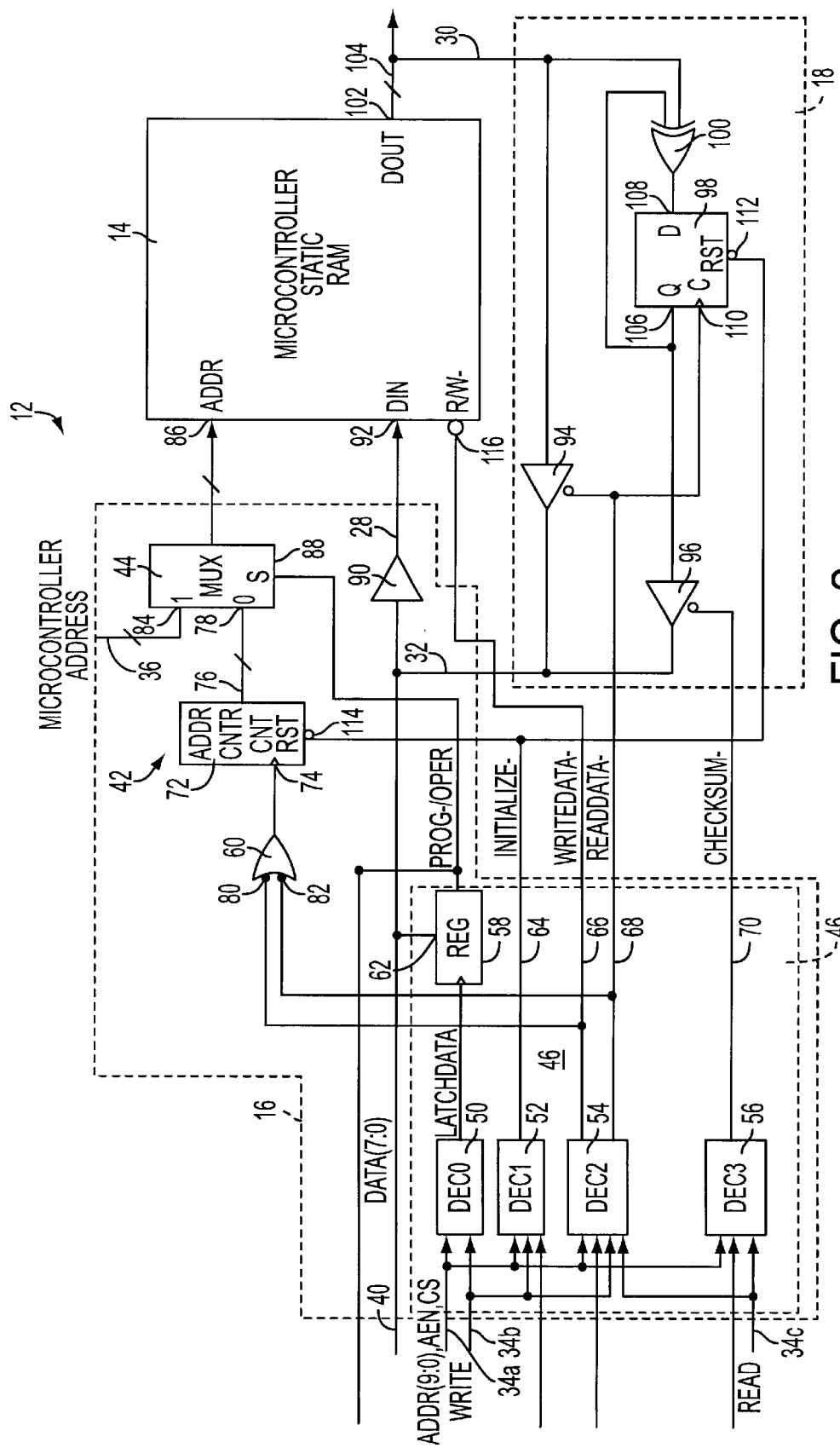
FIG. 2 is a schematic diagram of the program interface, static random access memory, and program verifier of the microcontroller embodying the present invention of FIG. 1.

Referring now to FIG. 2, it illustrates the memory system 12 in greater detail which includes the static random access memory 14, the program interface 16, and the program verifier 18. The program interface 16 generally includes a multiple-bit parallel data bus 40 which is adapted to be coupled to the multiple-bit bus 26 illustrated in FIG. 1, an address generator 42, a multiplexer 44, and a decoder 46.

The decoding means 46 is arranged to be coupled to the control lines 34a, 34b and 34c for receiving the control signals from the microprocessor 22. The control line 34a comprises a multiple-bit parallel bus over which the microprocessor 22 addresses the program interface 16 which has a unique multiple-bit address and conveys address enable and chip select signals. The decoder 46 receives a write control signal from the microprocessor over control line 34b to indicate that the program instructions are to be written into the static random access memory 14 and a read control signal over control line 34c to indicate that the programming of the static random access memory is to be verified.

The decoder 46 includes a first decoder 50, a second decoder 52, a third decoder 54 and a fourth decoder 56. The decoder 46 further includes a register 58 and an OR gate 60.

The first decoder 50 is coupled to control lines 34a and 34b to provide a clock signal to the register 58 in response to the control signals received over those lines. The register 58 has an input 62 coupled to one of the conductors of the bus 40 for receiving a logical zero from the microprocessor when the static random access memory 14 is to be programmed. The output of the register 58 is coupled back to one input of each of the second, third and fourth decoders 52, 54 and 56 respectively. The register 58 provides at its output a latched logical zero program mode select signal when the static random access memory is to be programmed. It provides the program mode select signal after having first received a logical zero from the microprocessor at its input 62 and then the clock signal from the first decoder 50. After programming and verification are completed, the microprocessor 22 provides a logical one to the input 62 of the register 58 and control signals over lines 34a and 34b to cause the decoder 50 to provide another clock signal to the register 58. This causes the register 58 to provide at its output a latched logical one operate mode select signal to revert the memory system 12 to an operate mode. This permits the execution unit to address the static random access memory 14 for obtaining the necessary program instructions for performing its required executions.

The second decoder 52 has an input coupled to the output of register 58, an input coupled to the bus 34a, and an input coupled to the control line 34b. The decoder 52 provides on a line 64 an initialization signal for resetting the memory system prior to the programming of the static random access memory 14 in response to the control signals received at its inputs.

The third decoder 54 has an input coupled to the output of register 58, an input coupled to the bus 34a, an input coupled to the control line 34b, and an input coupled to the control line 34c. It provides on lines 66 and 68 write data and read data strobe signals responsive to the control signals at its inputs for each byte of data to be written into or read from the static random access memory 14.

The fourth decoder 56 includes an input coupled to the output of register 58, an input coupled to the bus 34a and an input coupled to the control line 34c. It provides on a line 70 a check sum word strobe signal responsive to the control signals at its inputs to cause the generated multiple-bit sum of the program instructions to be conveyed to the microprocessor 22.

The address generator 42 comprises an address counter 72 which has a clock input 74 coupled to the output of OR gate 60. The counter 72 also includes a multiple-bit output 76 which is coupled to a multiple-bit input 78 of the multiplexer 44.

When each multiple-bit byte of data is written into or read from the static random access memory 14, the OR gate 60 receives a strobe signal from one of the lines 66 or 68. The inputs 80 and 82 of OR gate 60 are inverting inputs so that the read and write strobe signals are active when they are at a logical zero. In response to the strobe signals, the OR gate 60 provides clock signals to the address counter 72. The address counter 72 is preferably of the indexing type which generates the multiple-bit memory location addresses in consecutive order starting with the first memory location and ending with the last memory location of the static random access memory 14.

The multiplexer 44 includes another multiple-bit input 84 which is arranged to be coupled to the execution unit 20 of the microcontroller over the bus 36 for receiving the memory location addresses from the execution unit 20. The multiplexer selectively couples the address generator 42 or the execution unit 20 to the multiple-bit address input 86 of the memory 14 in response to the mode select signals received at its input 88 from the output of the register 58. When the memory system 12 is in the program mode, the register 58 will provide the logical zero to cause the multiplexer 44 to couple the output 76 of the address generator 42 to the address input 86 of the static random access memory 14. When the memory system is in the operate mode, the multiplexer 44 will receive at its input 88 the logical one from the register 58 to cause the multiplexer 44 to couple the execution unit 20 to the address input 86 of the static random access memory 14 to permit the execution unit to obtain program instructions from the memory 14.

The program interface 16 lastly includes a buffer 90. The buffer 90 couples the multiple-bit bus 40 to the multiple-bit data input 92 of the static random access memory 14.

The program verifier 18 includes a first tri-state buffer 94, a second tri-state buffer 96, register 98 and an exclusive OR gate 100. The program verifier 18 is coupled to the multiple-bit output 102 of the static random access memory for receiving the program instruction stored in the memory 14 when the program instructions are read by the microprocessor 22 for verification. The circuitry shown in FIG. 2, in practicing the present invention, would be duplicated for each of the bits of the multiple-bit words forming the program instructions. In accordance with this preferred embodiment, each of the multiple-bit bytes of data stored in the static random access memory 14 comprises 8 bits. Hence, eight circuits as illustrated as the program verifier 18 would be required to enable verification of the program instructions stored in the static random access memory 14. Those additional circuits have been omitted so as to not unduly complicate the drawing figure.

The input of the first tri-state buffer 94 is coupled to one of the conductors of the multiple-bit bus 104 which is coupled to the output 102 of the static random access memory 14. The output of the tri-state buffer 94 is coupled to the multiple-bit bus 40. As each byte of data is read from the static random access memory 14 by the microprocessor 22, the third decoder 54 provides a read strobe on line 68 which is coupled to the control input of the tri-state buffer 94. In response to receiving the read strobe signal, the tri-state buffer 94 conveys the value of the bit contained on its respective line to a respective one of the conductors of the multiple-bit bus 40. As a result, the bytes of data stored in the static random access memory 14 are conveyed to the microprocessor 22 through the program interface 16 to permit the microprocessor 22 to read the bytes of data for verifying the program instructions stored in the static random access memory 14.

The second tri-state buffer 96, the register 98, and the exclusive OR gate 100 comprise the summer of the program verifier 18 for the above-mentioned bit. One input of the exclusive OR gate 100 is coupled to the same bus conductor of bus 104 that the input of the tri-state buffer 94 is coupled to. The other input of the exclusive OR gate 100 is coupled to the output 106 of the register 98. The output of the exclusive OR gate 100 is coupled to the D input 108 of the register 98.

The register 98 includes a clock input 110 coupled to the line 68 for receiving the read strobe signals and an inverting reset input 112 coupled to line 64 for receiving the initialization signal from the second decoder 52. The output 106 of register 98 is coupled to the input of the tri-state buffer 96. The output of the tri-state buffer 96 is coupled to the bus 40 for providing a respective one of the conductors of bus 40 with the final summed value of the bit of the generated multiple-bit sum word. The control input of the tri-state buffer is coupled to the line 70 for receiving the check sum strobe signal from the fourth decoder 56. The check sum strobe signal which is an active logical zero causes the tri-state buffer 96 to convey the final sum of the corresponding bit to the respective conductor of the bus 40 after all of the programmed instructions have been read by the microprocessor.

Each time the system utilizing the microcontroller 10 is initialized, the static random access memory 14 must be programmed with its program instructions by the microprocessor 22. To begin this process, the microprocessor 22 first provides over one of the conductors of buses 26 and 40 a logical zero signal to the input 62 of the register 58. Also at this time, the microprocessor provides over bus 34a the address of the decoder 46 of the memory system 12 along with an address enable signal and a chip select signal and a write signal over line 34b. These signals are conveyed to the decoder 50 which decodes these signals and provides a clock signal to the register 58.

The clock signal to the register 58 causes the logical zero level at its input 62 to be latched at the output of register 58 to provide the logical zero program mode select signal. The program mode select signal is conveyed to the input 88 of multiplexer 44 to couple the multiple-bit input 78 of multiplexer 44 to the multiple-bit address input 86 of the static random access memory 14. The program mode select signal is also fed back to one input of each of the decoders 52, 54 and 56 for setting these decoders into the program mode.

The decoder address, the write control signal and the program mode select signal at the inputs of decoder 52 causes the decoder 52 to provide a logical zero initialization or reset signal to a reset input 114 of the address counter 72 and to each reset input of the registers of the program verifier 18, such as reset input 112 of register 98.

The microprocessor 22 is now ready to convey the program instructions to the static random access memory 14 through the program interface 16 with the program instructions being represented by multiple-bit bytes of data. As each byte of data is conveyed on the bus 40, the decoder address, the write control signal and the latched program mode select signal causes the decoder 54 to provide on line 66 the logical zero write data strobe signal which is conveyed to the read/write enable input 116 of the static random access memory 14 and to the inverting input 80 of the OR gate 60 which provides a clock signal at input 74 of the address counter 72. The clock signals with each byte of data causes the address counter 72 to increment to the next static random access memory location address for storing the consecutive bytes of data into corresponding consecutive memory locations of the static random access memory 14. The bytes of data are conveyed over the bus 26 to the bus 40, through the buffer 90, and over the bus 28 to the multiple-bit data input 92 of the static random access memory 14.

In accordance with this preferred embodiment, the static random access memory 14 includes memory locations for 2,048 bytes of data for defining its program instructions. After all 2048 bytes of data are stored in the static random access memory 14, the microprocessor 22 terminates the write control signal over line 34b. This causes decoder 52 to once again provide the reset signal over line 64 for resetting the address counter 72 and each of the registers of the program verifyier, such as register 98 illustrated in FIG. 2.

As the microprocessor reads each byte of data from the static random access memory 14, it provides the address of the decoder 46 over the bus 34a along with the read control signal over line 34c. These signals, together with the latched program mode select signal, causes the decoder 54 to provide on line 68 a logical zero read data strobe signal for each byte of data to be read by the microprocessor.

The read data strobe signal is conveyed to the inverting input 82 of the OR gate 60 for clocking the address counter 72 each time a byte of data is read to cause the address counter to generate the next consecutive memory location address of the static random access memory 14. The read data strobe signal is also conveyed to the control input of the tri-state buffer 94, to the clock input of the register 98, and to the clock inputs of all of the other registers of the verifying means 18. The read data signal causes the tri-state buffer 94 to convey the value of its corresponding bit of the byte being read to the bus 40, over the bus 32. Similarly, the other tri-state buffers of the program verifier 18 will likewise convey the value of their corresponding bits of each byte in parallel with the tri-state buffer 94 to convey each byte of data stored in the static random access memory 14 in parallel over the bus 32 to the bus 40 for being read by the microprocessor.

The read data strobe signal over line 68 also causes the registers, such as register 98, of verifying means 18, to generate the longitudinal parity checksum of all of the program instruction data bytes. After all of the bytes of data have been read by the microprocessor 22, the decoder 56 provides a logical zero check sum strobe signal over line 70 to each of the control inputs of each of the tri-state buffers of the verifying means 18. As illustrated, the tri-state buffer 96, when it receives the checksum signal over line 70, will convey the value on its Q output 106 onto the data bus 40 in parallel with the values of the other bits of the generated multiple-bit checksum word conveyed by the other tri-state buffers to convey to the microprocessor over the bus 40 the generated multiple-bit word representing the longitudinal parity checksum of all of the program instructions. This enables the microprocessor to compare the generated multiple-bit checksum word representing the longitudinal parity checksum of all of the program instructions to the predetermined multiple-bit word which is the known checksum of all of the program instructions. If the generated multiple-bit word is equal to the predetermined multiple-bit word, the microprocessor 22 will terminate the programming of the static random access memory 14 by providing a logical one signal to the input 62 of register 58. The microprocessor 22 then provides the address of the decoding means over bus 34*a* and the write control signal over line 34*b* to cause latch 50 to provide the register 58 with a clock signal to cause the register 58 to convey the logical one level at its input 62 to its output. The logical one operate mode select signal at the output of register 58 is latched by the register 58 and is the operate mode select signal which is conveyed to the input 88 of multiplexer 44. In response to receiving the operate mode select signal, the multiplexer 44 couples its input 84 to the multiple-bit address input 86 of the static random access memory 14 to permit the execution unit 20 to provide the static random access memory 14 with its generated memory location addresses. This enables the execution unit 20 to obtain its necessary program instructions from the static random access memory 14 which are conveyed to the execution unit 20 over the bus 104. The microcontroller 10 is now operating in association with the microprocessor 22 in a manner as previously described as a slave device to the microprocessor 22. In accordance with this preferred embodiment, the microcontroller 10 will then serve to interface the microprocessor 22 with the keyboard 24.

While a particular embodiment of the present invention has been shown and described, modifications may be made, and it is therefore intended to cover in the appended claims all such changes and modifications which fall within the true spirit and scope of the invention.

What is claimed is:

1. In a microcontroller of the type which includes an execution unit for executing stored program instructions, a memory system for storing said program instructions and comprising:

memory means for storing said program instructions, said memory means including a static random access memory; and program interface means coupled to said static random access memory and arranged to be coupled to an external source of said program instructions for providing said static random access memory with said program instructions from said external source of said program instructions for use by said microcontroller to control a device as a device driver, wherein said memory system further includes program verifying means including read enable means for enabling said external source of said program instructions to read said program instructions stored in said static random access memory for verification.

2. A microcontroller as defined in claim 1 wherein said program interface means includes a multiple-bit bus arranged to be coupled to said external source of said program instructions for receiving said program instructions from said external source and wherein said read enable means is coupled between said static random access memory and said multiple-bit bus for conveying said stored program instructions to said external source of said program instructions.

3. In a microcontroller of the type which includes an execution unit for executing stored program instructions, a memory system for storing said program instructions and comprising:

memory means for storing said program instructions, said memory means including a static random access memory; and program interface means coupled to said static random access memory and arranged to be coupled to an external source of said program instructions for providing said static random access memory with said program instructions from said external source of said program instructions for use by said microcontroller to control a device as a device driver, wherein each of said program instructions is a multiple-bit byte of data, wherein the sum of all said program instructions is a predetermined multiple-bit word, and wherein said memory system further includes program verifying means including summing means coupled to said static random access memory for generating a multiple-bit word representing the longitudinal checksum of all said program instructions and conveying means for conveying said generated multiple-bit word to said external source of said program instructions to enable the comparison of said generated multiple-bit word to said predetermined multiple-bit word.

4. A microcontroller as defined in claim 3 wherein said program interface means includes a multiple-bit bus arranged to be coupled to said external source of said program instructions for receiving said program instructions from said external source and wherein said conveying means is coupled to said multiple-bit bus for providing said external source of said program instructions with said generated multiple-bit word.

5. In a microcontroller of the type which includes an execution unit for executing stored program instructions, a memory system for storing said program instructions and comprising:

memory means for storing said program instructions, said memory means including a static random access memory; and program interface means coupled to said static random access memory and arranged to be coupled to an external source of said program instructions for providing said static random access memory with said program instructions from said external source of said program instructions for use by said microcontroller to control a device as a device driver, wherein each of said program instructions is a multiple-bit byte of data, wherein said static random access memory includes a plurality of memory locations for storing said bytes of data, wherein each of said memory locations has a unique address, and wherein said program interface means includes an address generator having an address counter coupled to said static random access memory for providing said static random access memory with said memory location addresses in consecutive order.

6. A microcontroller as defined in claim 5 wherein said execution unit is also arranged for generating said memory location addresses for obtaining said stored program instructions during the operation of said microcontroller and wherein said program interface means further includes a multiplexer for selectively coupling said address generator of said program interface means to said static random access memory during the programming of said static random access memory or said execution unit to said static random access memory during the operation of said microcontroller.

7. A microcontroller as defined in claim 6 wherein said external source of said program instructions is further arranged to provide program control signals, wherein said program interface means further includes decoding means arranged to be coupled to said external source of said program instructions for receiving said program control signals, wherein said decoding means is responsive to said control signals for generating a program mode select signal when said static random access memory is to be programmed with said program instructions and an operate mode select signal when said microcontroller is to be operated, and wherein said multiplexer is coupled to said decoding means and responsive to said mode select signals for selectively coupling said static random access memory to said address generator responsive to said program mode select signal or said execution unit responsive to said operate mode select signal.

8. A microcontroller as defined in claim 7 wherein said memory system further includes program verifying means including read enable means for enabling said external source of said program instructions to read said program instructions stored in said static random access memory for verification, and wherein said decoding means is arranged for providing said program select signal to said multiplexer responsive to said control signals during the reading of said stored program instructions.

9. A microcontroller as defined in claim 8 wherein each of said program instructions is a multiple-bit byte of data, wherein the sum of all said program instructions is a predetermined multiple-bit word, and wherein said program verifying means further includes summing means coupled to said static random access memory for generating a multiple-bit word representing the checksum of all of said program instructions and conveying means for conveying said generated multiple-bit word to said external source of said program instructions to enable the comparison of said generated multiple-bit word to said predetermined multiple-bit word.

10. A microcontroller of the type adapted to be coupled to a microprocessor and arranged to operate as a slave to said microprocessor, said microcontroller further being of the type which includes an execution unit for executing its own set of program instructions to control a device as a device driver, said microcontroller further including a memory system for obtaining said program instructions from said microprocessor and internally storing said program instructions and comprising:

a static random access memory having a plurality of addressable storage locations for storing said program instructions; and programming means coupled to said static random access memory and arranged to be coupled to said microprocessor for obtaining said program instructions from said microprocessor and including an address generator for addressing said storage locations and storing said program instructions within said storage locations of said static random access memory, wherein said programming means is arranged to obtain said program instructions from said microprocessor and said address generator is arranged to address said storage locations of said static random access memory in response to each initialization of said microprocessor.

11. A microcontroller as defined in claim 10 wherein said address generator comprises an address counter for addressing said storage locations of said static random access memory in consecutive order.

12. A microcontroller as defined in claim 11 wherein said address counter includes reset means for resetting said address counter in response to each initialization of said microprocessor.

13. A microcontroller as defined in claim 12 further comprising a multiple-bit bus directly coupling said execution unit with said programming means, wherein said execution unit provide addresses over said multiple-bit bus for obtaining said stored program instructions from said static random access memory during the operation of said microcontroller.

14. A microcontroller of the type adapted to be coupled to a microprocessor and arranged to operate as a slave to said microprocessor, said microcontroller further being of the type which includes an execution unit for executing its own set of program instructions to control a device as a device driver, said microcontroller further including a memory system for obtaining said program instructions from said microprocessor and internally storing said program instructions and comprising:

a static random access memory having a plurality of addressable storage locations for storing said program instructions; and programming means coupled to said static random access memory and arranged to be coupled to said microprocessor for obtaining said program instructions from said microprocessor and including an address generator for addressing said storage locations and storing said program instructions within said storage locations of said static random access memory, wherein said memory system further includes program verifying means including read enable means for enabling said microprocessor to read said program instructions stored in said static random access memory for verification.

15. A microcontroller as defined in claim 14 wherein said programming means further includes a multiple-bit bus arranged to be coupled to said microprocessor for obtaining said program instructions from said microprocessor and wherein said read enable means is coupled between said static random access memory and said multiple-bit bus for conveying said stored program instructions to said microprocessor.

16. A microcontroller of the type adapted to be coupled to a microprocessor and arranged to operate as a slave to said microprocessor, said microcontroller further being of the type which includes an execution unit for executing its own set of program instructions to control a device as a device driver, said microcontroller further including a memory system for obtaining said program instructions from said microprocessor and internally storing said program instructions and comprising:

a static random access memory having a plurality of addressable storage locations for storing said program instructions; and programming means coupled to said static random access memory and arranged to be coupled to said microprocessor for obtaining said program instructions from said microprocessor and including an address generator for addressing said storage locations and storing said program instructions within said storage locations of said static random access memory, wherein each of said program instructions is a multiple-bit byte of data, wherein the sum of all said program instructions is a predetermined multiple-bit word, and wherein said memory system further includes program verifying means including summing means coupled to said static random access memory for generating a multiple-bit word representing the sum of all said program instructions and conveying means for conveying said generated multiple-bit word to said microprocessor to enable the comparison of said generated multiple-bit word to said predetermined multiple-bit word.

17. A microcontroller as defined in claim 16 wherein said programming means includes a multiple-bit bus arranged to be coupled to said microprocessor for obtaining said program instructions from said microprocessor and wherein said conveying means is coupled to said multiple-bit bus for providing said microprocessor with said generated multiple-bit word.

18. A microcontroller of the type adapted to be coupled to a microprocessor and arranged to operate as a slave to said microprocessor, said microcontroller further being of the type which includes an execution unit for executing its own set of program instructions to control a device as a device driver, said microcontroller further including a memory system for obtaining said program instructions from said microprocessor and internally storing said program instructions and comprising:

a static random access memory having a plurality of addressable storage locations for storing said program instructions; and programming means coupled to said static random access memory and arranged to be coupled to said microprocessor for obtaining said program instructions from said microprocessor and including an address generator for addressing said storage locations and storing said program instructions within said storage locations of said static random access memory, wherein said execution unit is also arranged for addressing said storage locations for obtaining said stored program instructions during the operation of said microcontroller and wherein said programming means further includes a multiplexer for selectively coupling said address generator to said static random access memory during the programming of said static random access memory or said execution unit to said static random access memory during the operation of said microcontroller.

19. A microcontroller as defined in claim 18 wherein said microprocessor is further arranged to provide program control signals, wherein said program interface means further includes decoding means arranged to be coupled to said microprocessor for receiving said program control signals, wherein said decoding means is responsive to said control signals for generating a program mode select signal when said static random access memory is to be programmed with said program instructions and an operate mode select signal when said microcontroller is to be operated, and wherein said multiplexer is coupled to said decoding means and responsive to said mode select signals for selectively coupling said static random access memory to said address generator responsive to said program mode select signal or said execution unit responsive to said operate mode select signal.

20. A microcontroller as defined in claim 19 wherein said memory system further includes program verifying means including read enable means for enabling said microprocessor to read said program instructions stored in said static random access memory for verification, and wherein said decoding means is arranged for providing said program select signal to said multiplexer responsive to said control signals during the reading of said stored program instructions.

21. A method of providing operating instructions to a microcontroller, the method comprising the steps of:

storing said operating instructions in an external source;

during an initialization phase loading said instructions from said external source into a static random access memory;

accessing said operating instructions from said static random access memory and executing said instructions to operate said microcontroller to control a device; and verifying said loading of said operating instructions.

22. The method recited in claim 21 wherein said verifying step comprises:

generating a longitudinal check sum of all said operating instructions in said static random access memory and comparing said check sum to a predetermined word representing a sum of all said program instructions.

* * * * *